US010167022B2

(12) United States Patent
Lee et al.

(10) Patent No.: US 10,167,022 B2
(45) Date of Patent: Jan. 1, 2019

(54) VEHICULAR UNDERFRAME STRUCTURE

(71) Applicants: Hyundai Motor Company, Seoul (KR); Kia Motors Corporation, Seoul (KR); Hanwha Advanced Materials Corporation, Sejong (KR)

(72) Inventors: Moon Seop Lee, Yongin-si (KR); Huen Sick Min, Hwaseong-si (KR); Jeong Min Cho, Suwon-si (KR); Chang Dong Kim, Suwon-si (KR); Kun Ha Song, Sejong (KR); Joung Myung Lim, Sejong (KR)

(73) Assignees: Hyundai Motor Company, Seoul (KR); Kia Motors Corporation, Seoul (KR); Hanwha Advanced Materials Corporation, Sejong (KR)

( * ) Notice: Subject to any disclaimer, the term of this patent is extended or adjusted under 35 U.S.C. 154(b) by 21 days.

(21) Appl. No.: 15/642,059

(22) Filed: Jul. 5, 2017

(65) Prior Publication Data
US 2018/0162454 A1      Jun. 14, 2018

(30) Foreign Application Priority Data
Dec. 13, 2016   (KR) .................. 10-2016-0169548

(51) Int. Cl.
*B62D 25/20*      (2006.01)
*B62D 29/04*      (2006.01)
(52) U.S. Cl.
CPC ......... *B62D 25/20* (2013.01); *B62D 25/2036* (2013.01); *B62D 29/043* (2013.01)

(58) Field of Classification Search
CPC ... B62D 25/20; B62D 25/2036; B62D 29/043
USPC ......................................................... 296/204
See application file for complete search history.

(56) References Cited

U.S. PATENT DOCUMENTS

| | | | | |
|---|---|---|---|---|
| 4,848,835 A | * | 7/1989 | DeRees | B62D 21/02 296/204 |
| 6,318,794 B1 | * | 11/2001 | Berube | B32B 21/08 296/181.2 |
| 7,111,900 B2 | * | 9/2006 | Chernoff | B60H 1/0055 296/193.07 |
| 8,696,048 B2 | * | 4/2014 | Griffin | B62D 25/2054 296/184.1 |

(Continued)

FOREIGN PATENT DOCUMENTS

| | | |
|---|---|---|
| JP | 5988167 B2 | 9/2016 |
| KR | 10-2014-0012637 A | 2/2014 |
| KR | 10-2014-0024602 A | 3/2014 |

*Primary Examiner* — Pinel E Romain
(74) *Attorney, Agent, or Firm* — Morgan, Lewis & Bockius LLP

(57) ABSTRACT

A vehicular underframe structure may an include a lower panel including a composite material and having a central portion curved upwards along a longitudinal direction thereof; an upper panel including a composite material and combined on the lower panel wherein an undersurface thereof faces an upper surface of the lower panel with an internal compartment formed therebetween; and a rib portion provided in the internal compartment and having a lower rib integrally protruding upwards from the upper surface of the lower panel and an upper rib integrally protruding downwards from the undersurface of the upper panel.

11 Claims, 7 Drawing Sheets

(56) References Cited

U.S. PATENT DOCUMENTS

| | | | | |
|---|---|---|---|---|
| 2004/0062955 | A1* | 4/2004 | Kubota | B60K 1/04 429/9 |
| 2012/0104793 | A1* | 5/2012 | Danielson | B62D 29/046 296/181.1 |
| 2013/0313863 | A1* | 11/2013 | Yamaji | B62D 25/00 296/203.01 |
| 2017/0073020 | A1* | 3/2017 | Ayuzawa | B62D 21/157 |

* cited by examiner

VEHICULAR UNDERFRAME STRUCTURE

CROSS-REFERENCE(S) TO RELATED APPLICATIONS

The present application claims priority to Korean Patent Application No. 10-2016-0169548, filed on Dec. 13, 2016, the entire contents of which is incorporated herein for all purposes by this reference.

BACKGROUND OF THE INVENTION

Field of the Invention

The present invention relates to a vehicular underframe structure having a floor panel in which a lower panel and an upper panel are combined to form an internal compartment with ribs formed therein.

Description of Related Art

Conventionally, a floor panel is formed by molding a lower panel and an upper panel, including a steel material, using a press machine and then assembling the lower and upper panels using spot welding and an adhesive. The present method provides an advantage of improved impact strength, but has the problems of heavy weight and an increased number of parts.

Thus, provided is a vehicular underframe structure that can achieve an equivalent level of performance, weight reduction, and fuel economy relative to the related art by constructing a floor panel using a composite material, the provided vehicular underframe structure having an efficient structure for absorbing impact energy at the time of collision due to the implementation of rigid ribs.

The information disclosed in this Background of the Invention portion is only for enhancement of understanding of the general background of the invention and should not be taken as an acknowledgment or any form of suggestion that this information forms the prior art already known to a person skilled in the art.

BRIEF SUMMARY

Various aspects of the present invention are directed to providing a vehicular underframe structure having a floor panel in which a lower panel and an upper panel are combined to form an internal compartment with ribs formed therein.

Various aspects of the present invention are directed to providing a vehicular underframe structure including: a lower panel including a composite material and having a central portion curved upwards along a longitudinal direction thereof; an upper panel including a composite material and combined on the lower panel wherein an undersurface thereof faces an upper surface of the lower panel with an internal compartment formed therebetween; and a rib portion provided in the internal compartment and having a lower rib integrally protruding upwards from the upper surface of the lower panel and an upper rib integrally protruding downwards from the undersurface of the upper panel.

The lower panel may include: on the upper surface thereof, a pair of first curved portions provided on opposite lateral sides of the central portion in a form of being curved downwards along the longitudinal direction from a front end portion to a rear end portion of the lower panel; a pair of second curved portions provided at positions spaced by a distance laterally from the first curved portions, respectively, in a form of being curved downwards along the longitudinal direction from the front end portion to the rear end portion of the lower panel; and a third curved portion extending between the first curved portions in a form of being curved downwards along a width direction of the lower panel.

The upper panel may include: on the undersurface thereof, a central curved portion provided to correspond to the central portion wherein the central curved portion extends from a front end portion to a rear end portion of the upper panel in the longitudinal direction in a form of being curved upwards; a pair of first curved portions provided in a form of being curved upwards and respectively extending from the central curved portion to opposite lateral end portions of the upper panel in a width direction thereof; and a pair of second curved portions provided at positions corresponding to the opposite lateral sides of the third curved portion of the lower panel and below the pair of first curved portions wherein the second curved portions extend from the central curved portion to opposite lateral end portions of the upper panel in the width direction thereof.

The upper panel may further include: on the undersurface thereof, a pair of third curved portions provided upwards from the second curved portions of the lower panel wherein the third curved portions respectively extend in the longitudinal direction of the upper panel from the first curved portions to the front end portion of the upper panel in a form of being curved upwards; and a pair of fourth curved portions provided wherein the fourth curved portions respectively extend in the width direction of the upper panel from the third curved portions to opposite lateral end portions of the upper panel in a form of being curved upwards.

The lower rib may include: a first lower rib portion having a first lower rib axis and a plurality of second lower rib axes, wherein the first lower rib portion protrudes upwards from the first and second curved portions of the lower panel, wherein the third lower rib axis extends in the longitudinal direction of the first and second curved portions, and wherein the plurality of second lower rib axes respectively extend in the width direction of the first and second curved portions while intersecting with the first lower rib axis; and a second lower rib portion having a third lower rib axis and a plurality of fourth lower rib axes, wherein the second lower rib portion protrudes upwards from the third curved portion, wherein the third lower rib axis extends in the width direction of the lower panel, and wherein the plurality of fourth lower rib axes respectively extend in the longitudinal direction of the lower panel while intersecting with the third lower rib axis.

The upper rib may include: a first upper rib portion protruding downwards from the first and second curved portion of the upper panel, the first upper rib portion including: a first upper rib axis extending in the width direction of the upper panel; and a plurality of second upper rib axes respectively extending in the longitudinal direction of the upper panel while intersecting with the first upper rib axis.

The upper rib may further include: a second upper rib portion protruding downwards from the third curved portion of the upper panel, the second upper rib portion including: a third upper rib axis extending in the longitudinal direction of the upper panel; and a plurality of fourth upper rib axes respectively extending in the width direction of the upper panel while intersecting with the third upper rib axis; and a third upper rib portion protruding downwards from the fourth curved portion of the upper panel, the third upper rib portion including: a fifth upper rib axis extending in the width direction of the upper panel; and a plurality of sixth upper rib axes respectively extending in the longitudinal direction of the upper panel while intersecting with the fifth upper rib axis.

The sixth upper rib axes may be formed to protrude downwards to the upper surface of the lower panel, forming a closed sectional structure in the internal compartment.

The lower panel may have a pair of first bent portions bent upwards from opposite lateral end portions thereof, and wherein the vehicular underframe structure may further include a pair of side seals of steel that are to be brought into contact with and connected to the pair of first bent portions.

The upper panel may have a pair of second bent portions bent upwards from opposite lateral end portions thereof, and wherein the vehicular underframe structure may further include a pair of reinforcing portions respectively extending to be inclined from the upper surface of the upper panel to the second bent portions.

The lower panel and the upper panel may be made from a composite material including a chopped strand-type reinforcing fiber and a compound in which the reinforcing fiber is dispersed.

According to the vehicular underframe structure of the present invention as described above, since the ribs are provided in the internal compartment formed by the lower panel and the upper panel, it is possible to increase the rigidity of a floor panel including the lower panel and the upper panel.

The apparatuses of the present invention have other features and advantages which will be apparent from or are set forth in more detail in the accompanying drawings, which are incorporated herein, and the following Detailed Description, which together serve to explain certain principles of the present invention.

Figure 1:
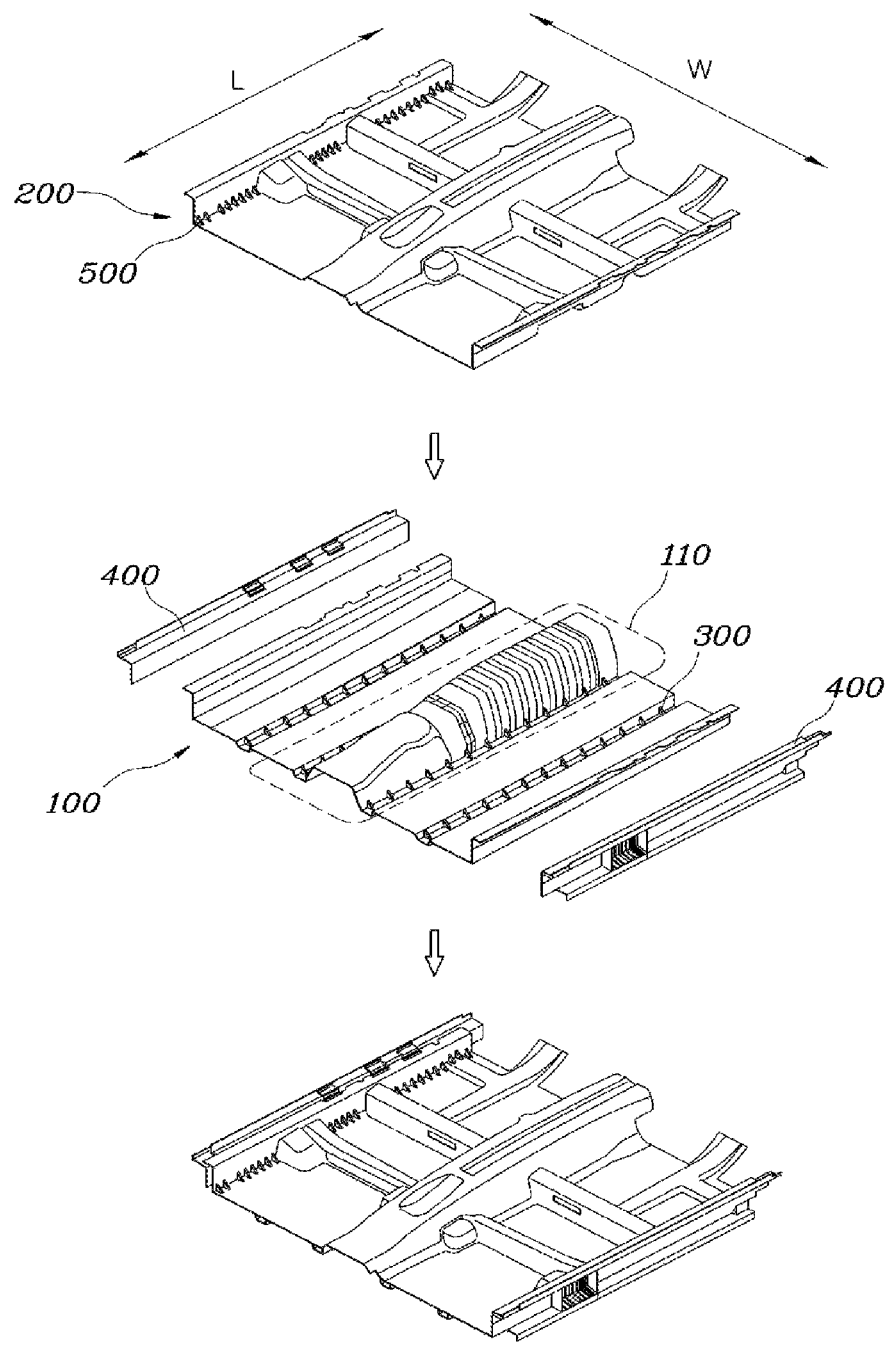
FIG. 1 is a view illustrating a vehicular underframe structure according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
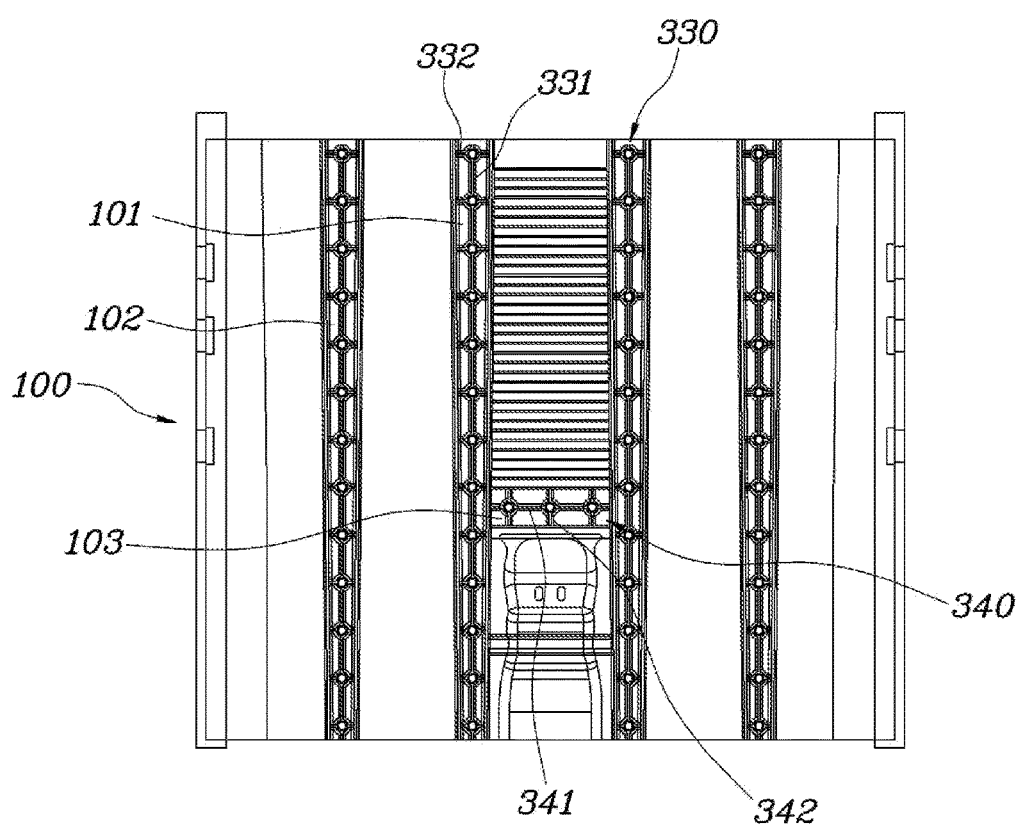
FIG. 2 is a view illustrating a top portion surface of a lower panel of the vehicular underframe structure according to an exemplary embodiment of the present invention.
Figure 3:
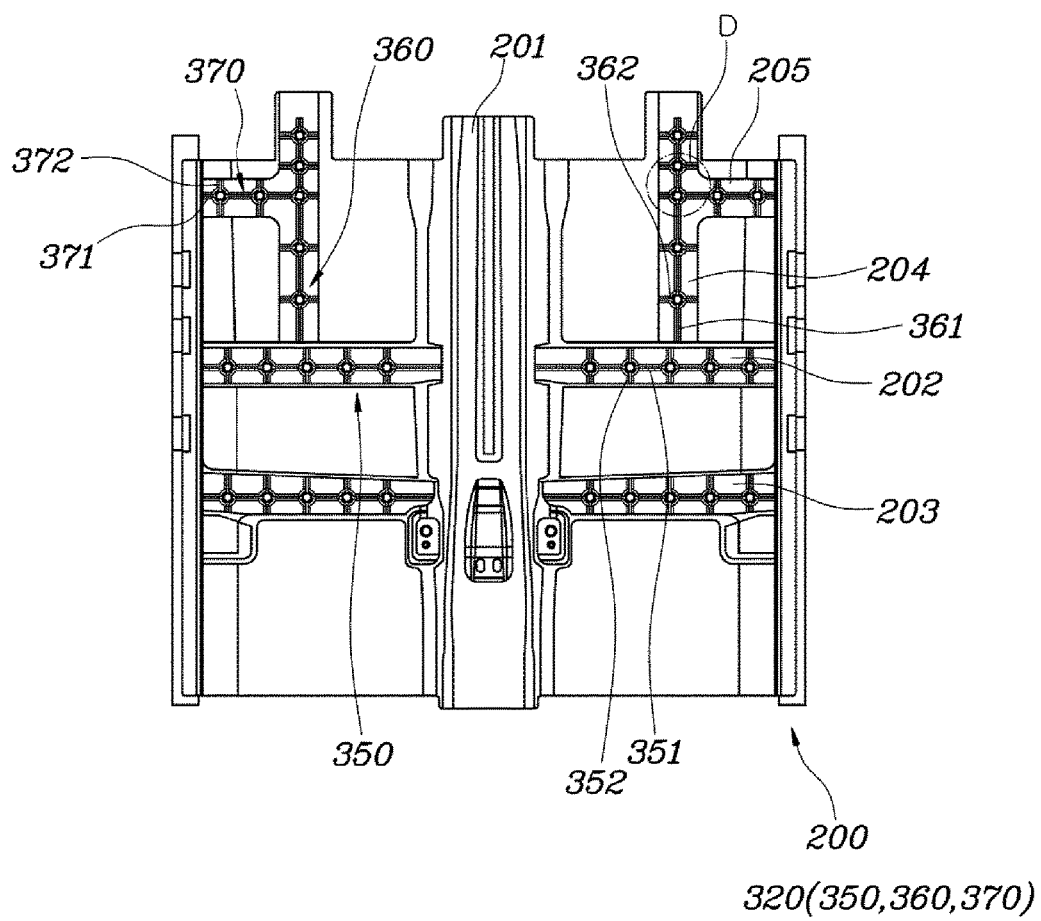
FIG. 3 is a view illustrating a back surface of the lower panel of the vehicular underframe structure according to an exemplary embodiment of the present invention.

As seen in FIG. 1 to FIG. 3, a vehicular underframe structure according to an exemplary embodiment of the present invention may include a lower panel 100 including a composite material and having a central portion 110 curved upwards along a longitudinal direction thereof; an upper panel 200 including a composite material and combined on the lower panel 100 wherein an undersurface thereof faces an upper surface of the lower panel with an internal compartment 10 formed therebetween; and a rib portion 300 provided in the internal compartment 10 and having a lower rib 310 integrally protruding upwards from the upper surface of the lower panel 100 and an upper rib 320 integrally protruding downwards from the undersurface of the upper panel 200.

The lower panel 100 is a component of a floor panel constituting a vehicle body. The lower panel has a planar shape, and the central portion 110 of the lower panel extends longitudinally from a front end portion to a rear end portion of the lower panel in a form of being curved upwards. The lower panel 100 includes a composite material including reinforcing fiber and resin. The reinforcing fiber may include, but is not limited to, one or more kinds of fiber selected from carbon fiber, glass fiber, aramid fiber, and natural fiber. The resin may be thermosetting resin including unsaturated polyester or the like.

The longitudinal direction (or longitudinally) used herein is a direction that corresponds to the direction indicated by 'L' in FIG. 1, so it may mean a direction extending between a front side and a rear side of a vehicle body. On the other hand, the width direction used herein may be a direction that corresponds to the direction indicated by 'W' in FIG. 1.

The upper panel 200 has a planar shape, and is combined on the lower panel 100 wherein the undersurface thereof faces the upper surface of the lower panel 100, forming a floor panel. Here, since the undersurface of the upper panel 200 and the upper surface of the lower panel 100 do not abut against each other at various portions when combined with each other, internal compartments 10 are formed at those portions.

Similarly, the upper panel 200 includes a composite material including reinforcing fiber and resin. The reinforcing fiber may include, but is not limited to, one or more kinds of fiber selected from carbon fiber, glass fiber, aramid fiber, and natural fiber. The resin may be thermosetting resin including unsaturated polyester or the like.

The lower panel 100 and the upper panel 200 may be fixedly combined with each other using an adhesive, a blind rivet, or the like.

The rib portion 300 is integrally formed on the lower panel 100 and the upper panel 200 in the internal compartment 10, increasing the rigidity of a floor panel constituting a vehicle body. Thus, the rib portion 300 may be formed during the molding of the lower panel 100 or the upper panel 200. The lower rib 310 is formed to protrude upwards from the upper surface of the lower panel 100, and the upper rib 320 is formed to protrude downwards from the undersurface of the upper panel 200.

The lower panel 100 has, on the upper surface thereof, a pair of first curved portions 101, a pair of second curved portions 102, and a third curved portion 103. The pair of first curved portions 101 is provided on opposite sides of the central portion 110 in a form of being curved downwards along the longitudinal direction from the front end portion to the rear end portion of the lower panel 100. The pair of second curved portions 102 are provided at positions spaced by a distance laterally from the first curved portions 101, respectively, in a form of being curved downwards, along the longitudinal direction from the front end portion to the rear end portion of the lower panel 100. The third curved portion 103 is provided, extending between the first curved portions 101 in a form of being curved downwards along a width direction of the lower panel.

The pair of first curved portions 101 is provided on opposite sides of the central portion 110, respectively. The first curved portion extends from the front end portion to the rear end portion of the lower panel 100 in a downwardly-curved form. Thus, when the lower panel 100 and the upper panel 200 are combined together, the first curved portions 101 may allow a portion of an internal compartment 10 to be formed.

A lower portion of the first curved portion 101 of the lower panel 100 is configured as a heater-protector mount.

The pair of second curved portions 102 is provided at positions separated by a distance laterally from the first curved portions 101, respectively. The second curved portion 102 extends in a form of being curved downwards along the longitudinal direction from the front end portion to the rear end portion of the lower panel 100. Thus, when the lower panel 100 and the upper panel 200 are combined together, the second curved portions 102 may allow a portion of an internal compartment 10 to be formed.

A lower portion of the second curved portion 102 of the lower panel 100 is configured as an under-cover mount.

The third curved portion 103 extends in a width direction of the lower panel 100 between the first curved portions 101 across the central portion 110 in a form of being curved downwards. The formation of the third curved portion 103 enables a portion of an internal compartment 10 to be formed in the central portion 110. Such an internal compartment 10 allows the internal compartments formed by the first curved portions 101 to communicate with each other.

Here, the width direction may mean a direction that extends horizontally on the lower panel 100 with respect to a vehicle body.

A lower portion of the third curved portion 103 of the lower panel 100 is configured as a muffler-hanger mount.

The lower ribs 310 may be formed to protrude upwards from the first, second and third curved portions 101, 102, and 103, which form the upper surface of the lower panel 100 and also define the internal compartment 10 along with the undersurface of the upper panel 200. The lower ribs 310 formed on the first and second curved portions 101 and 102 are configured to increase the impact strength of a floor panel in the longitudinal direction thereof, and the lower rib 310 formed on the third curved portions 103 are configured to increase the impact strength of a floor panel in the width direction thereof.

The upper panel 200 has, on the undersurface thereof, a central curved portion 201, a pair of first curved portions 202, and a pair of curved portions 203, which are all curved upwards. The central curved portion 201 is provided to correspond to the central portion 110 wherein the central curved portion extends in the longitudinal direction of the upper panel 200 from a front end portion to a rear end portion of the upper panel 200. The pair of first curved portions 202 respectively extends from the central curved portion 201 to opposite end portions of the upper panel 200 in a width direction thereof. The pair of second curved portions 203 is provided at positions corresponding to the opposite sides of the third curved portion 103 of the lower panel and below the pair of first curved portions 202 wherein the second curved portions extend from the central curved portion to opposite end portions of the upper panel 200 in the width direction thereof.

The central curved portion 201 is provided above the central portion 110 wherein the central curved portion 201 extends in the longitudinal direction from the front end portion to the rear end portion of the upper panel 200 in a form of being curved upwards to correspond to the upwardly-curved form of the central portion 110.

A tunnel-type internal compartment 10 defined between the central curved portion 201 and the upper surface of the central portion 110 is configured as a mount for a TGS cable and a console.

The first curved portions 202 are provided in a pair. The first curved portions 202 extend from the central curved portion 201 to the opposite lateral sides of the upper panel 200 in a form of being curved upwards. Thus, when the lower panel and the upper panel are combined together, the first curved portions 202 may allow a portion of an internal compartment 10 to be formed.

An upper portion of the first curved portions 202 of the upper panel 200 are configured as both a mount for a front side of a front seat and a guide for a passage of a rear duct.

The second curved portions 203 are provided in a pair at positions upwards from the opposite end portions of the third curved portion 103 of the lower panel 100 and below the first curved portions 202. The second curved portions 203 extend from the central curved portion 201 to the opposite lateral sides of the upper panel 200 in a form of being curved upwards. Thus, when the lower panel and the upper panel are combined together, the second curved portions 203 may allow a portion of an internal compartment 10 to be formed. Further, the internal compartments 10 defined by the second curved portions 203 may be formed to communicate with the internal compartment 10 defined by the third curved portion 103.

An upper portion of the second curved portion 203 of the upper panel 200 is configured as a mount for a rear portion of a front seat and provides an environment for legroom.

The upper ribs 320 may be formed to protrude downwards from the first and second curved portions 202 and 203, which form the undersurface of the upper panel 200 and also define the internal compartment 10 along with the upper surface of the lower panel 100. The upper ribs 320 formed on the first and second curved portions 202 and 203 are configured to increase the impact strength of a floor panel in the width direction thereof.

The upper panel 200 may further include, on the undersurface thereof, a pair of third curved portions 204 provided upwards from the second curved portions 102 of the lower panel wherein they respectively extend in the longitudinal direction of the upper panel from the first curved portions 202 to the front end portion of the upper panel 200 in a form of being curved upwards, and a pair of fourth curved portions 205 provided wherein they respectively extend in the width direction of the upper panel from the third curved portions 204 to opposite lateral end portions of the upper panel 200 in a form of being curved upwards.

The third curved portions 204 extend in the longitudinal direction of the upper panel from the first curved portions 202 to the front end portion of the upper panel 200 in a form of being curved upwards. Since the third curved portions are positioned upwards from an upper portion of the second curved portions 102 of the lower panel 100, they form an internal compartment 10 together with the front portion of the second curved portions 102. The front end portion of the third curved portions 204 is connected to a dash panel of a vehicle.

The fourth curved portions 205 respectively extend in the width direction of the upper panel from the third curved portions 204 to opposite lateral end portions of the upper panel in a form of being curved upwards. Thus, when combined with the lower panel 100, the fourth curved portions 205 may form a portion of an compartment 10 along with the third curved portions 204.

The upper ribs 320 may be formed to protrude downwards from the third and fourth curved portions 204 and 205, which form the undersurface of the upper panel 200 and also define the internal compartment 10 along with the upper surface of the lower panel 100. The upper ribs 320 formed on the third curved portions 204 are configured to increase the impact strength of a floor panel in the width direction thereof along with the lower ribs 310 formed on the second curved portions 102. Further, the upper ribs 320 formed on the fourth curved portions 205 may increase the impact strength of a floor panel in the width direction thereof.

The lower ribs 310 may include: a first lower rib portion 330 having a first lower rib axis 331 and a plurality of second lower rib axes 332; and a second lower rib portion 340 having a third lower rib axis 341 and a plurality of fourth lower rib axes 342. The first lower rib portion 330 protrudes upwards from the first and second curved portions 101 and 102 of the lower panel. The third lower rib axis 331 extends in the longitudinal direction of the first and second curved portions 101 and 102. The plurality of second lower rib axes 332 respectively extend in the width direction of the first and second curved portions 101 and 102 while intersecting with the first lower rib axis 331. The second lower rib portion 340 protrudes upwards from the third curved portion 103. The third lower rib axis 341 extends in the width direction of the lower panel. The plurality of fourth lower rib axes 342 respectively extend in the longitudinal direction of the lower panel while intersecting with the third lower rib axis 341.

The first lower rib portions 330 are formed along the first and second curved portions 101 and 102 of the lower panel. The first lower rib portions 330, which are formed on the first curved portions 101 provided on both lateral sides of the central portion 110, may protect a TGG cable and a console, which are mounted in a vehicle body, from a longitudinal impact applied to the vehicle body. The first lower rib portions 330 formed on the second curved portions 102 may protect an under-cover mounted in a vehicle body during a longitudinal impact applied to the vehicle body.

The first lower rib portion 330 includes the first lower rib axis 331 longitudinally formed on the first or second curved portion 101 or 102, and the plurality of second lower rib axes 332 formed in the width direction while intersecting with the first lower rib axis 331 to form a plurality of interportion points. Thus, the first lower rib portion 330 can protect a vehicle body during a longitudinal or widthwise impact.

The second lower rib portion 340 formed along the third curved portion 103 can protect a muffler hanger from a widthwise impact applied to a vehicle body. The second lower rib portion 340 includes the third lower rib axis 341 formed on the third curved portion 103 in the width direction of the lower panel, and the plurality of fourth lower rib axes 342 respectively extending in the longitudinal direction of the lower panel while intersecting with the third lower rib axis 341 to form a plurality of interportion points. Similarly, the second lower rib portion 340 can protect a vehicle body during a longitudinal or widthwise impact.

The upper rib 320 may include a first upper rib portion 350 that protrudes downwards from the first or second curved portion 202 or 203 of the upper panel. The first upper rib portion 350 may have a first upper rib axis 351 extending in the width direction of the upper panel, and a plurality of second upper rib axes 352 respectively extending in the longitudinal direction of the upper panel while intersecting with the first upper rib axis 351.

The first upper rib portion 350 is formed along the first or second curved portion 202 or 203. The first upper rib portion 350 extends in the width direction of the upper panel from the central curved portion 201, and thus can protect a front seat and a passenger seated thereon from a widthwise impact applied to a vehicle body.

The first upper rib portion 350 includes the first upper rib axis 351 formed on the first or second curved portion 202 or 203 in the width direction of the upper panel, and the plurality of second upper rib axes 352 respectively extending in the longitudinal direction of the upper panel while intersecting with the first upper rib axis 351 to form a plurality of interportion points. Thus, it is possible to protect a vehicle body during a longitudinal or widthwise impact.

Figure 8:
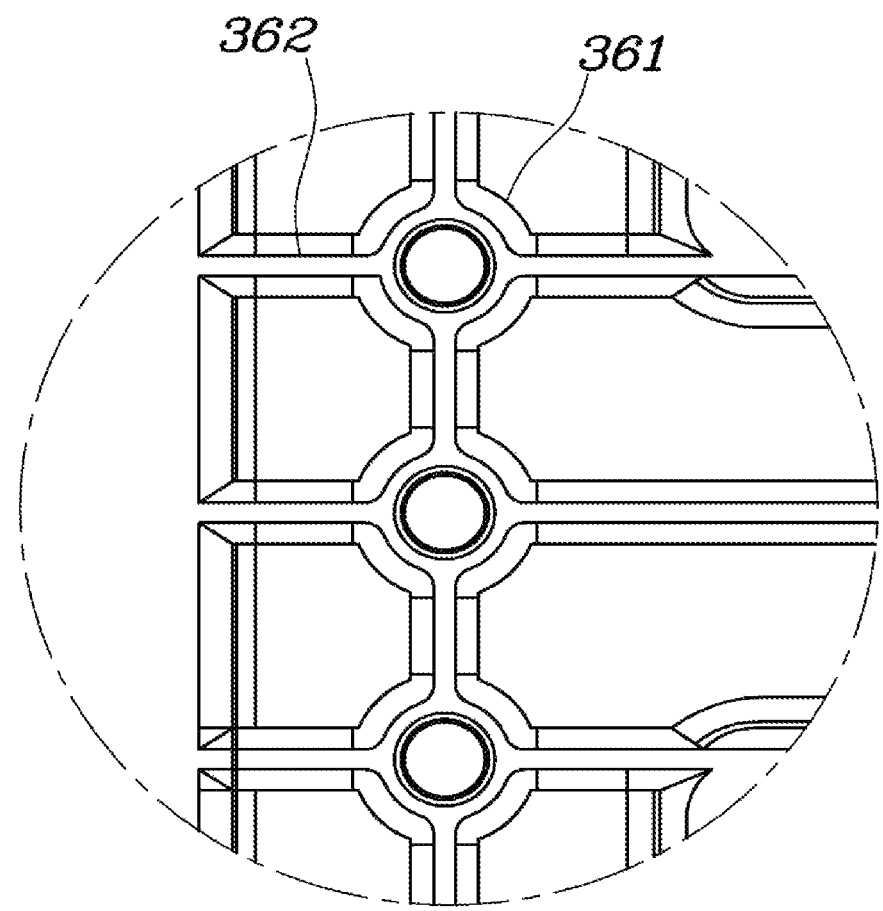
FIG. 8 is a view illustrating rib portions of the vehicular underframe structure according to an exemplary embodiment of the present invention.

As seen from FIG. 8, the upper rib 320 may further include a second upper rib portion 360 protruding downwards from the third curved portion 204 of the upper panel, and a third upper rib portion 370 protruding downwards from the fourth curved portion 205 of the upper panel. The second upper rib portion 360 may have a third upper rib axis 361 extending in the longitudinal direction of the upper panel, and a plurality of fourth upper rib axes 362 respectively extending in the width direction of the upper panel while intersecting with the third upper rib axis 361. The third upper rib portion 370 may have a fifth upper rib axis 371 extending in the width direction of the upper panel, and a plurality of sixth upper rib axes 372 respectively extending in the longitudinal direction of the upper panel while intersecting with the fifth upper rib axis 371.

FIG. 8 shows the portion D in FIG. 3. The second upper rib portion 360 is formed along the third curved portion 204 of upper panel. Thus, the second upper rib portion 360 may be opposite to the first lower rib portion 330 formed on the second curved portion 102 of the lower panel, and it is thus possible to protect a vehicle body during a front impact. The second upper rib portion 360 has the third upper rib axis 361 longitudinally formed on the third curved portion 204 of the upper panel, and the plurality of fourth upper rib axes 362 extending widthwise while forming a plurality of interportion points with the third upper rib axis 361. Thus, it is possible to protect a vehicle body during a longitudinal or widthwise impact.

The third upper rib portion 370 is formed along the fourth curved portion 205 of the upper panel. Thus, it is possible to protect a front seat and a passenger seated thereon from a widthwise impact. The third upper rib portion 370 has the fifth upper rib axis 371 formed widthwise on the fourth curved portion 205 of the upper panel, and the plurality of sixth upper rib axes 372 extending longitudinally while forming a plurality of interportion points with the fifth upper rib axis 371. Thus, it is possible to protect a vehicle body during a longitudinal or widthwise impact.

Figure 5:
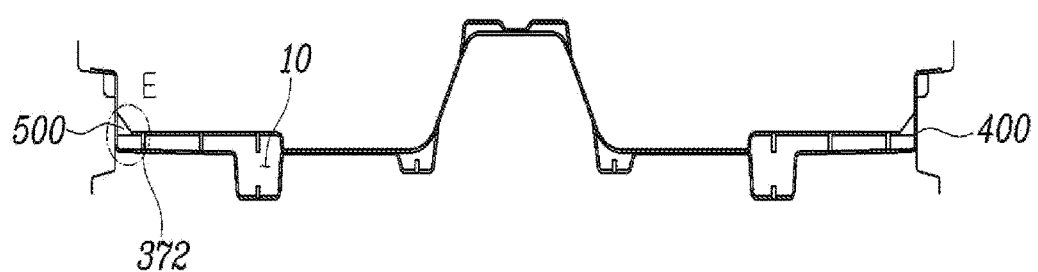
FIG. 5 is a cross-sectional view illustrating the vehicular underframe structure according to an exemplary embodiment of the present invention.

As can be seen from FIG. 5, the sixth upper rib axes 372 may be formed to protrude downwards to the upper surface of the lower panel 100, forming a closed sectional structure in the internal compartment 10.

The present configuration in which the sixth upper rib axes 372 are formed along the fourth curved portion 205 of the upper panel to protrude downwards to the upper surface of the lower panel 100 can increase the rigidity and reinforce the connection between the lower panel 100 and the upper panel 200 as well.

When cutting a floor panel including the lower panel 100 and the upper panel 200, it is possible to see a closed sectional structure defined by the lower panel 100, the upper panel 200, and the six upper rib axes 372.

Figure 6:
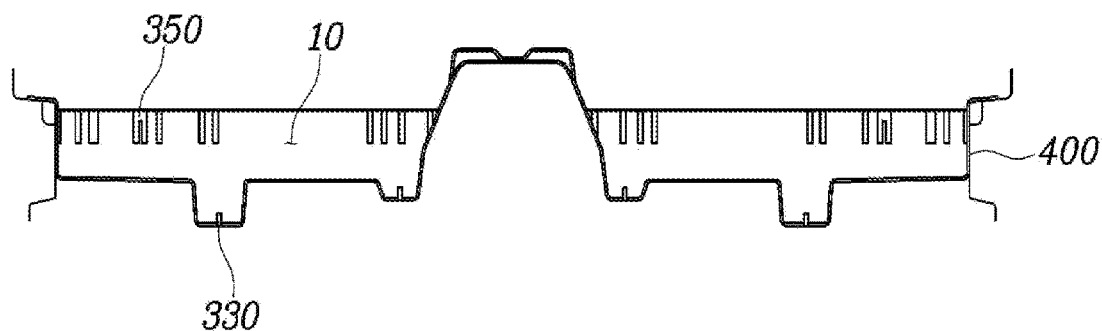
FIG. 6 is a cross-sectional view illustrating the vehicular underframe structure according to an exemplary embodiment of the present invention.
Figure 7:
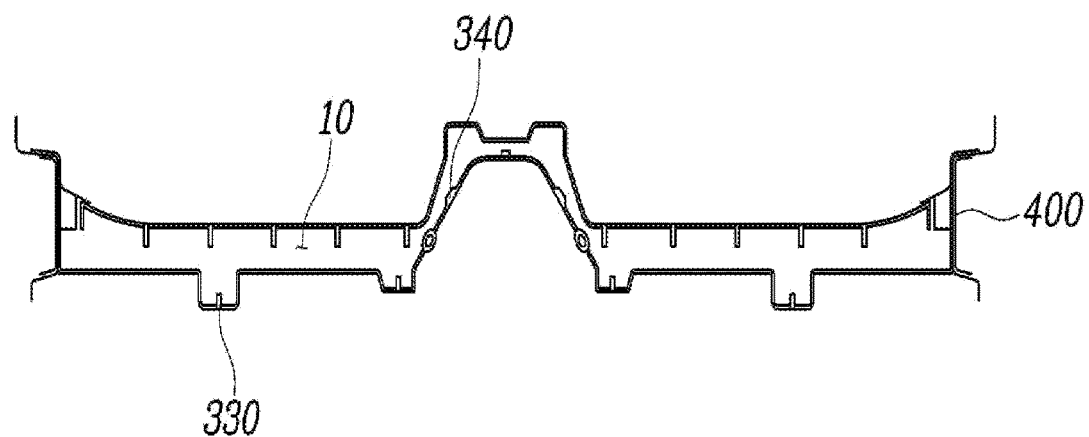
FIG. 7 is a cross-sectional view illustrating the vehicular underframe structure according to an exemplary embodiment of the present invention.

As seen from FIG. 5 to FIG. 7, preferably, the lower panel 100 may have a pair of first bent portions bent upwards from opposite lateral end portions thereof, and the vehicular underframe structure of the present invention may further include a pair of side seals 400 of steel that are to be brought into contact with and connected to the pair of first bent portions.

Figure 4:
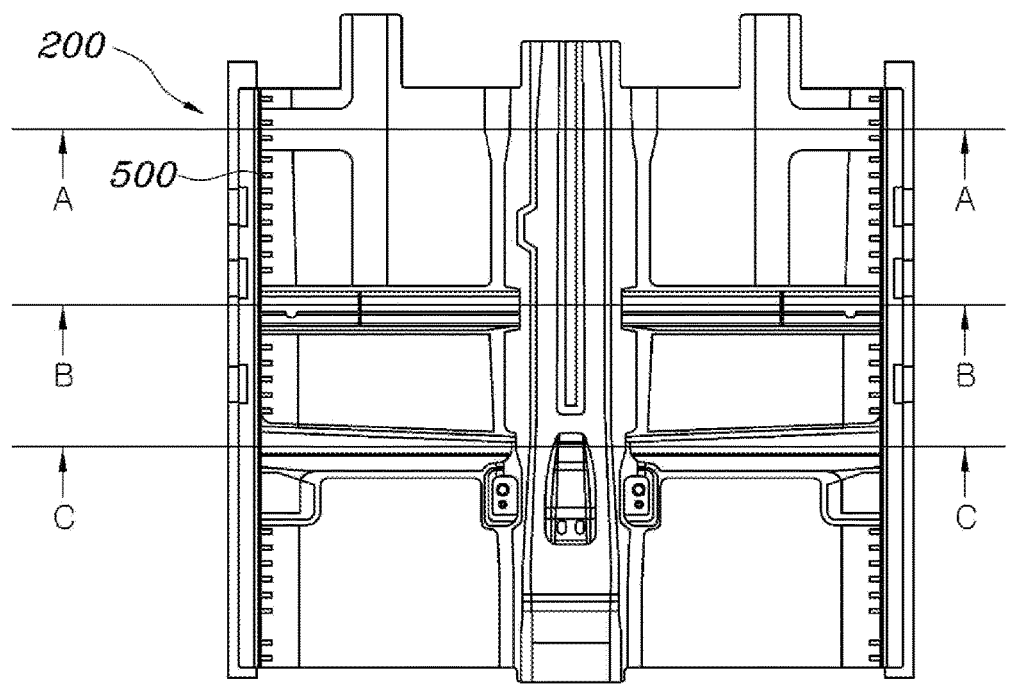
FIG. 4 is a view illustrating the vehicular underframe structure according to an exemplary embodiment of the present invention.

FIG. 5 shows a cross portion taken along line A-A of FIG. 4, FIG. 6 shows a cross portion taken along line B-B of FIG. 4, and FIG. 7 shows a cross portion taken along line C-C of FIG. 4. The first bent portions are formed by upwardly bending opposite lateral end portions distanced from the central portion 110 of the lower panel 100. The pair of side seals 400 of steel is connected to the first bent portions so that they are connected to opposite lateral sides of a floor panel including the lower panel 100 and the upper panel 200.

The pair of side seals 400 may be secured to the floor panel using an adhesive.

Figure 9:
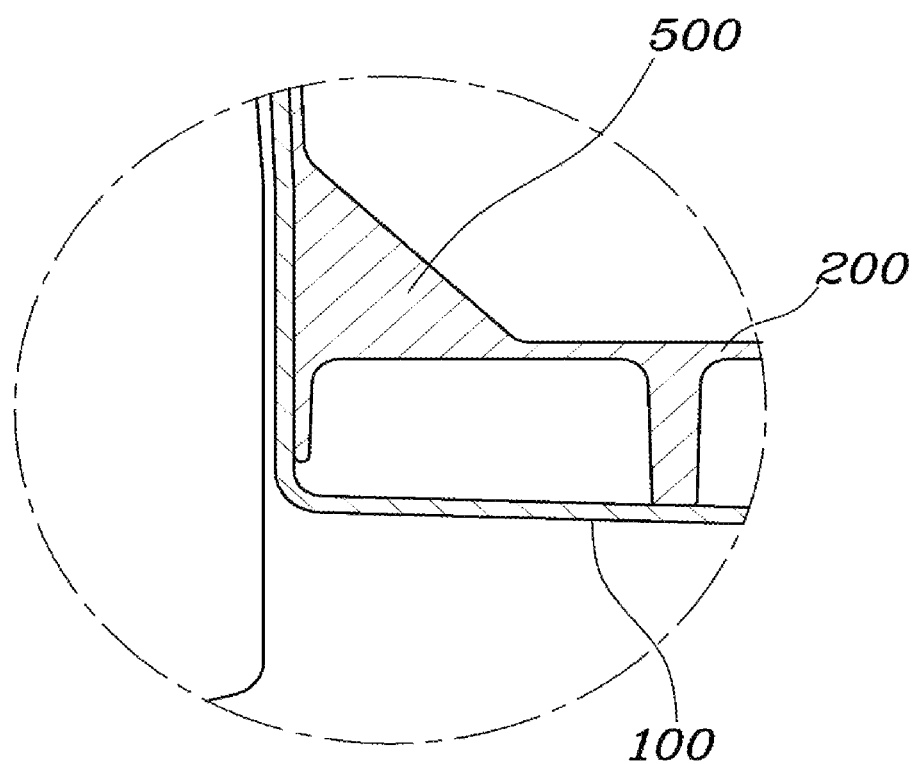
FIG. 9 is a view illustrating a reinforcement part of the vehicular underframe structure according to an exemplary embodiment of the present invention.

As seen from FIG. 4, FIG. 5, and FIG. 9, preferably, the upper panel 200 may have a pair of second bent portions bent upwards from opposite lateral end portions thereof, and the vehicular underframe structure of the present invention may further include a pair of reinforcing portions 500 respectively extending to be inclined from the upper surface of the upper panel 200 to the second bent portions. Thus, it is possible to improve the strength for a lateral impact.

FIG. 9 is an enlarged view illustrating portion E in FIG. 5. Opposite lateral end portions of the upper panel 200 are also bent upwards to correspond to the shape of the first bent portions so that the undersurfaces of the bent lateral end portions of the upper panel 200 are abutted against the upper surfaces of the bent lateral end portions of the lower panel 100. In the meantime, the upper surfaces of the lateral end portions of the upper panel 200 face each other. The reinforcing members 500 are formed to be inclined upwards towards the upper surfaces of the upper panel 200 and are connected to the second bent portions. Thus, it is possible to improve the strength to resist a lateral impact.

The lower panel 100 and the upper panel 200 may be made from a composite material including a chopped strand-type reinforcing fiber and a compound in which the reinforcing fiber is dispersed.

That is, the composite material of the lower panel 100 and the upper panel 200 is provided wherein the chopped strand-type reinforcing fiber is dispersed in the compound. Here, the chopped strand-type reinforcing fiber may mean reinforcing fiber including long or short filaments. The reinforcing fiber may include glass fiber, and the compound may include unsaturated polyester resin and an additive including a filling agent, a curing agent, a thickening agent, a releasing agent, or the like. Thus, the lower panel 100 and the upper panel 200 may be formed from a sheet molding compound (SMC) using the above components.

For convenience in explanation and accurate definition in the appended claims, the terms "upper", "lower", "internal", "outer", "up", "down", "upwards", "downwards", "front", "rear", "back", "inside", "outside", "inwardly", "outwardly", "internal", "external", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicular underframe structure comprising:
    a lower panel including a composite material and having a central portion curved upwards along a longitudinal direction thereof;
    an upper panel including a composite material and combined on the lower panel wherein an undersurface thereof faces an upper surface of the lower panel with an internal compartment formed therebetween; and
    a rib portion provided in the internal compartment and having a lower rib integrally protruding upwards from the upper surface of the lower panel and an upper rib integrally protruding downwards from the undersurface of the upper panel.

2. The vehicular underframe structure of claim 1, wherein the lower panel includes: on the upper surface thereof,
    a pair of first curved portions provided on opposite lateral sides of the central portion in a form of being curved downwards along the longitudinal direction from a front end portion to a rear end portion of the lower panel;
    a pair of second curved portions provided at positions spaced by a distance laterally from the first curved portions, respectively, in a form of being curved downwards, along the longitudinal direction from the front end portion to the rear end portion of the lower panel; and
    a third curved portion extending between the first curved portions in a form of being curved downwards along a width direction of the lower panel.

3. The vehicular underframe structure of claim 2, wherein the upper panel includes: on the undersurface thereof,
- a central curved portion provided to correspond to the central portion wherein the central curved portion extends in the longitudinal direction of the upper panel from a front end portion to a rear end portion of the upper panel in a form of being curved upwards;
- a pair of first curved portions provided in a form of being curved upwards and respectively extending from the central curved portion to opposite lateral end portions of the upper panel in a width direction thereof; and
- a pair of second curved portions provided at positions corresponding to the opposite lateral sides of the third curved portion of the lower panel and below the pair of first curved portions wherein the second curved portions extend from the central curved portion to opposite lateral end portions of the upper panel in a width direction thereof.

4. The vehicular underframe structure of claim 3, wherein the upper panel further includes: on the undersurface thereof,
- a pair of third curved portions provided upwards from the second curved portions of the lower panel wherein the third curved portions respectively extend in the longitudinal direction of the upper panel from the first curved portions to the front end portion of the upper panel in a form of being curved upwards; and
- a pair of fourth curved portions provided wherein the fourth curved portions respectively extend in a width direction of the upper panel from the third curved portions to opposite lateral end portions of the upper panel in a form of being curved upwards.

5. The vehicular underframe structure of claim 2, wherein the lower rib includes:
- a first lower rib portion having a first lower rib axis and a plurality of second lower rib axes, wherein the first lower rib portion protrudes upwards from the first and second curved portions of the lower panel, wherein the third lower rib axis extends in a longitudinal direction of the first and second curved portions, and wherein the plurality of second lower rib axes respectively extend in a width direction of the first and second curved portions while intersecting with the first lower rib axis; and
- a second lower rib portion having a third lower rib axis and a plurality of fourth lower rib axes, wherein the second lower rib portion protrudes upwards from the third curved portion, wherein the third lower rib axis extends in a width direction of the lower panel, and wherein the plurality of fourth lower rib axes respectively extend in a longitudinal direction of the lower panel while intersecting with the third lower rib axis.

6. The vehicular underframe structure of claim 3, wherein the upper rib includes:
- a first upper rib portion protruding downwards from the first and second curved portion of the upper panel, the first upper rib portion including:
- a first upper rib axis extending in a width direction of the upper panel; and
- a plurality of second upper rib axes respectively extending in a longitudinal direction of the upper panel while intersecting with the first upper rib axis.

7. The vehicular underframe structure of claim 4, wherein the upper rib further includes:
- a second upper rib portion protruding downwards from the third curved portion of the upper panel, the second upper rib portion including: a third upper rib axis extending in a longitudinal direction of the upper panel; and a plurality of fourth upper rib axes respectively extending in a width direction of the upper panel while intersecting with the third upper rib axis; and
- a third upper rib portion protruding downwards from the fourth curved portion of the upper panel, the third upper rib portion including: a fifth upper rib axis extending in a width direction of the upper panel; and a plurality of sixth upper rib axes respectively extending in a longitudinal direction of the upper panel while intersecting with the fifth upper rib axis.

8. The vehicular underframe structure of claim 7, wherein the sixth upper rib axes is formed to protrude downwards to the upper surface of the lower panel, forming a closed sectional structure in the internal compartment.

9. The vehicular underframe structure of claim 1, wherein the lower panel has a pair of first bent portions bent upwards from opposite lateral end portions thereof, and wherein the vehicular underframe structure further includes a pair of side seals of steel that are configured to be brought into contact with and connected to the pair of first bent portions.

10. The vehicular underframe structure of claim 9, wherein the upper panel has a pair of second bent portions bent upwards from opposite lateral end portions thereof, and wherein the vehicular underframe structure further includes a pair of reinforcing portions respectively extending to be inclined from the upper surface of the upper panel to the second bent portions.

11. The vehicular underframe structure of claim 1, wherein the lower panel and the upper panel are made from a composite material including a chopped strand-type reinforcing fiber and a compound in which the reinforcing fiber is dispersed.

* * * * *